June 5, 1934.  E. H. COOPER ET AL  1,961,128
SPRING CONNECTION
Filed May 11, 1932
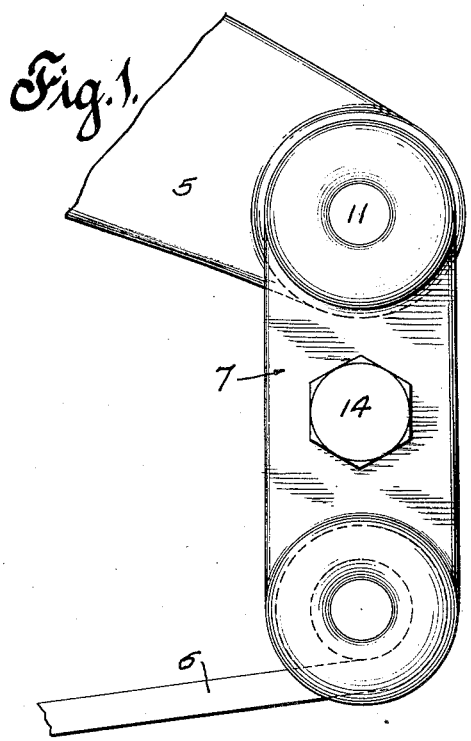
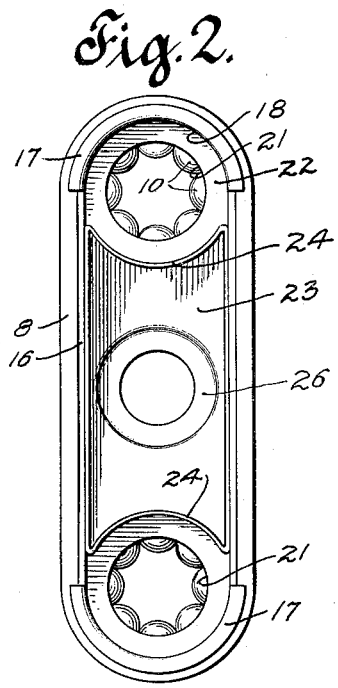
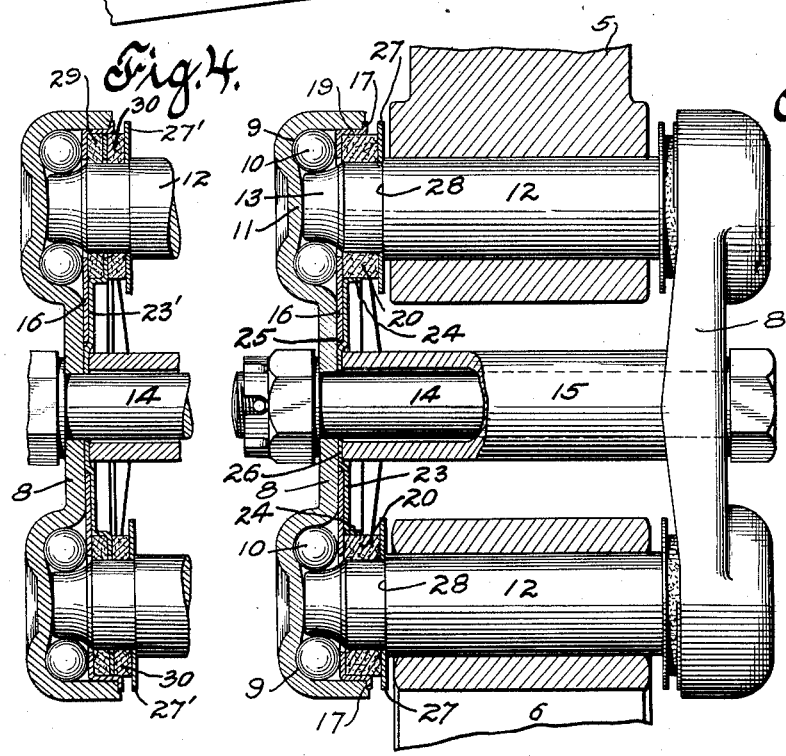
Elisha H. Cooper
Raymond R. Searles
John W. Smith
INVENTORS
BY
ATTORNEYS.

Patented June 5, 1934

1,961,128

UNITED STATES PATENT OFFICE 1,961,128

SPRING CONNECTION

Elisha H. Cooper, Raymond R. Searles, and John W. Smith, New Britain, Conn., assignors to The Fafnir Bearing Company, New Britain, Conn., a corporation of Connecticut Application May 11, 1932, Serial No. 610,722

19 Claims. (Cl. 267—54)

Our invention relates to a spring connection and more particularly to a seal therefor.

It is the general object of the invention to provide a very simple, inexpensive, yet very efficient, seal for a spring connection.

The invention will be disclosed as embodied in a spring shackle of the type claimed in Searles application, Serial No. 499,928, filed December 4, 1930. It is to be understood, however, that our improved seal may be embodied in various types of spring connections and in a shackle other than that herein shown.

In the drawing which shows, for illustrative purposes only, preferred forms of the invention—

Fig. 1 is a fragmentary view in elevation of the end of a spring and frame connected by means of a shackle;

Fig. 2 is an inside view in elevation of one of the shackle links and associated parts of Fig. 1;

Fig. 3 is an end view in partial section of the parts shown in Fig. 1 and viewed from the right;

Fig. 4 is a fragmentary view in section, similar to Fig. 3, and illustrating a modification.

In said drawing, 5 indicates a frame, while 6 indicates a spring, which are connected by a shackle designated generally 7. Each shackle comprises a pair of links 8—8 which are preferably duplicates of each other, and a description of one will suffice for both. Each link 8 in its preferred form may be formed of pressed metal channeled throughout its length and provided with depressed cupped raceways 9—9 at spaced points thereon for receiving anti-friction bearing devices such as balls 10—10. The central portion of each raceway may be forced in as indicated at 11 so as to form a depressed annular raceway track and prevent the balls from falling radially inwardly. The balls may be held against outward axial displacement by the seal ring means to be disclosed.

The frame and spring carry bearing raceway means such as pins 12 each having a raceway 13 at each end for coaction with the balls 10—10. In the form shown, the pin 12—12 abut the links 8—8 centrally of the raceway portions thereof so that end thrusts are taken directly between the pins 12 and the links 8—8. A connecting member such as a through-bolt 14 serves to connect the links, and, if desired, a spacer sleeve 15 may be provided to limit the extent to which the links may be drawn together by the through-bolt 14.

In order to retain lubricant on the anti-friction bearing members and their races and to exclude foreign matter therefrom, we have devised a very efficient form of seal which is simple in construction and inexpensive to manufacture and assemble. In the preferred form shown, we provide a sheet metal plate member 16 of channel form which preferably fits into the channeled portion of the link peripherally as illustrated. Each sheet metal plate 16 may be provided with a continuous or interrupted flange or outwardly bent lip means 17 to abut the extreme outside edge of the channel of the link 8 so as to limit its movement in one direction and afford an added support. Each plate 16 of channel form has a semi-circular portion 18 formed by the upstanding flange or channel part 19 and which serves to embrace and support the outer peripheral edge of a felt or other dust ring or seal device 20. The bottom of the channeled plate 16 is apertured as indicated at 21—21 for the passage of the ends of the pins 12—12, and the bottom of the channeled plate 16 preferably extends into engagement with, or at least quite close to, the balls 10—10 so as to prevent their accidental displacement from their races before the links are assembled on the ends of the pins 12—12.

Each ring 20, which is supported on its flat side by the flat bottom portion 22 of the plate 16, may be supported at the edge opposite the flanged portion 18 by suitable means such as a second channel-shaped plate 23 which may be pressed into the channel of the plate 16. The plate 23 is provided with a semi-circular portion at each end formed by upstanding rounded flanges 24—24 so as to form with the rounded flange portions 18 of the plate 16 a substantially cup-shaped recess at each end for the reception and support of the dust rings 20—20 at their bottom and their outside peripheral edges.

In the preferred form shown, the bottom of the plate 16 is provided with an enlarged aperture 25 at the zone of the through-bolt 14, and the channel plate 23 has a depressed boss 26 fitting in the enlarged aperture 25 and abutting inside of each link 8—8 and which is engaged by the spacer 15 when such spacer is employed.

Each dust ring 20 is supported at its side projecting from the cup in the seal plates by suitable means such as a plate or washer 27, which, in the preferred form, is carried by each pin 12 and may abut the shoulder 28 thereon. By proper positioning of the washer 27 each dust ring 20 may be compressed to the desired extent during assembly and subsequent use of the shackle.

In the modified form shown in Fig. 4, the plate 16 and shackle parts 8 may all be precisely the same as heretofore described. The plate 23', corresponding in general to the plate 23, is, however, extended so as to substantially completely fill the channeled plate 16 and is offset from the plate 16 so as to provide a retaining space or chamber for the dust rings 29. Thus, such dust rings 29 may be so secured to the shackle links and held against accidental disengagement before the links are assembled with the outer parts of the shackle. A washer 27' in this case may be carried by the pin 12 as heretofore described, and a second dust ring or washer 30 may be interposed and compressed between the washer 27 and the seal involving the first dust ring 29. Thus, a double seal is formed which will serve to exclude foreign matter and retain lubricant as in the first form.

It will thus be seen that we have provided a form of seal which is simple in construction, cheap to manufacture, and very effective in use.

While preferred forms have been illustrated and as applied only to a shackle, it is to be understood that various modifications, additions, and omissions may be made within the scope of the invention as defined in the appended claims.

We claim:

1. In a spring shackle, a bearing pin to be carried by a frame and project beyond the sides thereof, a second bearing pin to be carried by a spring and project beyond the sides thereof, a pair of shackle links engaging the ends of said pins whereby end thrusts may be taken directly between said pins and shackle links, anti-friction bearing devices interposed between said links and pins for taking radial loads, means for connecting said links, each of said links having a longitudinal channel, a sheet metal channeled plate fitting within the channel of said link, said sheet metal plate having a flange bearing on the edge of said link, yielding sealing means within said channeled sheet metal plate and surrounding projecting portions of said pins, and a sheet metal washer carried by each end of said pins, said yielding sealing means being interposed between said washer and said channeled sheet metal plate.

2. In a spring shackle, a shackle link, anti-friction bearing devices carried by said link, a bearing member having a race for coaction with said anti-friction bearing devices, a sheet metal plate extending over said bearing devices, a yielding dust seal supported at a portion of its peripheral edge by said sheet metal plate, and means to engage said yielding dust seal at another portion of its peripheral edge whereby the latter may be supported at opposite edges by and between said sheet metal plate and said means.

3. In a spring shackle, a channeled shackle link, a set of anti-friction bearing devices carried thereby at each end thereof, a sheet metal channeled plate pressed into said channeled link at and between the ends thereof, and a second sheet metal plate carried by the intermediate portion of said first plate, both plates having coacting means thereon for supporting the outer peripheral edges of dust seal members for both sets of anti-friction devices.

4. In a shackle construction, a shackle link of channel form, a sheet metal channel plate fitting in the channel of said link and having flange means engaging the edge of the channel, said sheet metal plate having a supporting portion for a dust seal ring, a second plate fitting within said first mentioned channel plate and having an upstanding flange for supporting said dust seal ring at the edge.

5. In a spring shackle, a shackle link having a marginal flange integral therewith forming a longitudinal channel, and dust excluding means including a sheet metal plate having an angularly extending flange engaging the inner longitudinal walls of said marginal flange.

6. In a spring shackle construction, a shackle link of channel form, anti-friction bearing devices carried by said link at spaced points thereon, and seal means including a pair of sheet metal channeled members interfitting with each other and carried by said link for supporting yielding dust excluding closure means.

7. In a shackle construction, a shackle link, anti-friction bearing devices carried thereby at spaced points thereon, a sheet metal plate carried by said link and extending over said anti-friction bearing devices to assist in holding the same in place, said plate having an enlarged opening therein intermediate its ends, a second sheet metal plate interfitting with said first mentioned sheet metal plate and having a depressed boss thereon extending within said enlarged aperture.

8. In a spring shackle construction, a shackle link, a pair of plates carried by said link and having at each end integral offset flanged portions and dust rings peripherally supported by said offset flanged portions.

9. In a spring connection, a connecting member having a raceway for anti-friction bearing devices, a sheet metal plate extending over said anti-friction bearing devices to assist in maintaining the latter in place, a dust ring, said plate acting as a support for a portion of the outside peripheral edge of a dust ring, and a second member for supporting a dust ring at the opposite outside peripheral edge thereof.

10. In a spring connection, a connecting member having a cupped portion forming a raceway for anti-friction bearing devices, a sheet metal member carried by said connecting member to assist in maintaining said anti-friction bearing devices in said raceway and having a part to support a yielding seal member, and a second sheet metal member carried by a member having a raceway complementary to said connecting member raceway to assist in supporting said seal member.

11. In a spring connection, a connecting member having a cupped portion forming a raceway for anti-friction bearing devices, anti-friction bearing devices thereon, another raceway member to engage said anti-friction bearing devices, a washer on said raceway member, a sheet metal member on said connecting member, and a dust seal member interposed between said washer and said sheet metal member.

12. In a spring connection, a connecting member having a cupped portion forming a raceway for anti-friction bearing devices, anti-friction bearing devices thereon, a raceway member for coaction with said anti-friction bearing devices, a pair of formed sheet metal plates for supporting a yielding seal member therebetween on said connecting member by engaging different portions of the outside peripheral edges of said seal, a washer on said raceway member, and a second yielding seal member between one of said formed sheet metal members and said washer.

13. In a spring connection, a connecting member having a cupped portion forming an integral raceway for anti-friction bearing devices, a raceway member for coaction with said anti-friction bearing devices, a seal including three plate members having spaced apart parts forming two parallel seal receiving chambers, and yielding seal members arranged side by side in said chambers, one of said plates being carried by said raceway member and one of said plates being carried by said connecting member.

14. In a spring shackle construction, a shackle link of channel form having raceways for anti-friction bearing devices at spaced points thereon, anti-friction bearing devices on said raceways, raceway members for coaction with said anti-friction bearing devices, a washer on each of said raceway members, a pair of formed plates fitting within said channeled link and having spaced apart portions for supporting seal rings therebetween, and other seal rings supported at one side by said washers.

15. In a spring shackle construction, a shackle link of channel form, and a seal device comprising a pair of formed plates within said channeled link and having parts for supporting seal rings at spaced apart points thereon, and means for limiting the depth to which said formed plates may be inserted into said channeled link.

16. In a device of the character described, a cupped bearing member, another bearing member projecting into said cupped member, raceways on said members, antifriction devices between said raceways, a protector ring for said devices to protect the latter at the open side of said cupped member, two members having complementary shaped portions to support said ring at its outer edge by embracing the outside peripheral edges of said ring between them.

17. In a device of the character described, a cupped bearing member, another bearing member projecting into said cupped member, raceways on said members, antifriction devices between said raceways, a protector ring for said devices to protect the latter at the open side of said cupped member, two members having complementary shaped portions to support said ring at its outer edge by embracing the outside peripheral edges of said ring between them, and a second protector ring mounted on said second bearing member and at the outer side of and supplementing the first protector ring.

18. In a spring connector, a shackle link channeled throughout its length, the ends of said channel being deepened to form cup-like depressions, a raceway in each depressed portion for receiving anti-friction devices, a dust protector means for the open side of each depression comprising a plate mounted in said channel and shaped at each end to support the outer peripheral edge of a dust ring for a portion of its length, and another plate overstanding the first plate and shaped at each end to support said outer peripheral edge of a dust ring for another portion of its length.

19. In a spring connector, a shackle link channeled throughout its length, the ends of said channel being deepened to form cup-like depressions, a raceway in each depressed portion for receiving anti-friction devices, a dust protector means for the open side of each depression comprising a plate mounted in said channel and shaped at each end to support the outer peripheral edge of a dust ring for a portion of its length, and another plate overstanding the first plate and shaped at each end to support said outer peripheral edge of a dust ring for another portion of its length, the first plate also extending under the dust ring to form a bottom support, the second plate extending over said dust ring to hold it in place.

ELISHA H. COOPER.
RAYMOND R. SEARLES.
JOHN W. SMITH.